United States Patent
Nakamura et al.

(10) Patent No.: US 8,154,821 B2
(45) Date of Patent: Apr. 10, 2012

(54) MAGNETIC HEAD-POSITIONING SERVO SYSTEM, MAGNETIC HEAD TEST SYSTEM AND MAGNETIC DISK TEST SYSTEM

(75) Inventors: Shigeo Nakamura, Odawara (JP); Kimihiko Sudo, Yokohama (JP); Toshinori Sugiyama, Ninomiya (JP); Yasuhiro Matsuda, Ishioka (JP); Yukio Yamamoto, Toride (JP); Yoshihiro Sakurai, Hadano (JP)

(73) Assignee: Hitachi High-Technologies Corporation, Tokyo (JP)

( * ) Notice: Subject to any disclaimer, the term of this patent is extended or adjusted under 35 U.S.C. 154(b) by 104 days.

(21) Appl. No.: 12/537,616

(22) Filed: Aug. 7, 2009

(65) Prior Publication Data
US 2010/0079900 A1 Apr. 1, 2010

(30) Foreign Application Priority Data
Sep. 29, 2008 (JP) .................................. 2008-249462

(51) Int. Cl.
*G11B 5/596* (2006.01)
(52) U.S. Cl. ............... 360/77.02; 360/77.04; 360/78.05; 360/294.2; 360/294.4

(58) Field of Classification Search .................. None
See application file for complete search history.

(56) References Cited

U.S. PATENT DOCUMENTS

| | | | | |
|---|---|---|---|---|
| 5,920,441 A | * | 7/1999 | Cunningham et al. | 360/78.05 |
| 6,376,964 B1 | * | 4/2002 | Young et al. | 310/311 |
| 2003/0128456 A1 | * | 7/2003 | Shitara et al. | 360/77.07 |
| 2006/0109586 A1 | * | 5/2006 | White et al. | 360/78.05 |
| 2008/0007863 A1 | * | 1/2008 | Kim et al. | 360/77.04 |

FOREIGN PATENT DOCUMENTS

| JP | 2004-048955 | 2/2004 |
|---|---|---|
| JP | 2006-268955 | 10/2006 |

* cited by examiner

*Primary Examiner* — Andrew L Sniezek
(74) *Attorney, Agent, or Firm* — Antonelli, Terry, Stout & Kraus, LLP.

(57) ABSTRACT

A magnetic head-positioning servo system is provided to accurately test a magnetic disk with a track written in advance, by providing two fine actuators. The second fine actuator, to which a magnetic head is attached, is mounted on the first fine actuator. The second fine actuator has a larger generating displacement than a generating displacement of the first fine actuator, and lets the magnetic disk to follow the eccentricity of the track. In this way, the positioning accuracy can be increased.

20 Claims, 5 Drawing Sheets

ECCENTRICITY
COMPENSATION
TABLE DATA

FIG.6

MAGNETIC HEAD-POSITIONING SERVO SYSTEM, MAGNETIC HEAD TEST SYSTEM AND MAGNETIC DISK TEST SYSTEM

FIELD OF THE INVENTION

The present invention relates to a magnetic head-positioning servo system, a magnetic head test system and a magnetic disk test system. More particularly, the present invention relates, for example, to a test system for positioning a magnetic head to a target track on a magnetic disk, which is particularly suitable when the eccentricity of the track is large.

BACKGROUND OF THE INVENTION

Magnetic disks, as well as magnetic heads used for writing and reading data to and from magnetic disks are tested in relation to their characteristics by a test system before being mounted to magnetic disk systems (see, for example, JP-A No. 268955/2006). Magnetic head test is performed in the form of head gimbal assembly (HGA) in which a head-suspension and a magnetic head are assembled together. At the time of testing, a magnetic head is located above a magnetic disk rotated by a rotating spindle to write and read data to and from the magnetic disk.

A piezoelectric actuator is often used as an actuator for precise positioning. In general, the displacement of the piezoelectric actuator is about several μm to 20 μm. In order to make the displacement of the fine actuator bigger than the above range, a displacement magnifying mechanism can be used to mechanically increase the displacement. A lever, which is well known as the fundamental principle, can be applied to increase the displacement of the piezoelectric actuator (see, for example, JP-A No. 48955/2004).

Further, in this test system, a second fine actuator may be mounted on a first fine actuator (see, for example, JP-A No. 268955/2006). In this case, the first fine actuator can be used to let the magnetic head to follow the eccentricity.

SUMMARY OF THE INVENTION

In the test system for performing the test described above, the HGA is fixed on the fine actuator operating to let the magnetic head to follow a target track on the magnetic disk. The target track is not necessarily concentric to the rotation center of the magnetic disk, but having distortion of first-order rotation, namely eccentricity as well as distortion of higher order frequency components. The eccentricity of the target track occurs for the following reasons. One is that the center of the target track once written to the magnetic disk is displaced from the rotation center due to assemblage error and the like occurring in attachment and detachment of the magnetic disk to and from the spindle. Another is that the written target track is not itself circular, but distorted. In magnetic disks, such as discrete track media (DTM) and bit patterned media (BPM), on which a target track is written in advance, there could be an increase in the eccentricity due to the displacement between the center of the target track and the rotation center of the spindle at the time the magnetic disk is mounted on the spindle. In such a case, it is necessary to increase the generating displacement of the fine actuator to drive the HGA on which the magnetic head is mounted.

For example, there is a case where one actuator is used to let the magnetic head mounted on the HGA to follow the target track. In this case, when the eccentricity of the target track is large, it is necessary to increase the displacement of the actuator to move the HGA, requiring an actuator with a large generating displacement. However, there is a problem that the positioning accuracy decreases. The actuator with a large generating displacement can obtain a large displacement with reduced spring-rigidity to support the moving part, resulting in a decrease in the resonance frequency of the actuator. The servo band width of the positioning servo system is reduced, leading to a problem of a decrease in the positioning-accuracy of the magnetic head.

There is another case where two actuators are used to let the magnetic head mounted on the HGA to follow the target track. In other words, a second fine actuator is mounted on a first fine actuator and the magnetic head is let to follow the eccentricity by the first fine actuator. In this case, large displacement is necessary to move a large mass including the second fine actuator in order to let the magnetic head to follow the eccentricity. This generates large vibration due to the driving reaction force, leading to a problem that the positioning-accuracy of the magnetic head is degraded.

It is a feature of the present invention to solve these problems by mounting a second fine actuator having a generating displacement larger than that of a first fine actuator, on the first fine actuator. The second fine actuator is used for following the eccentricity of first-order rotation of the target track. Then, the first fine actuator is used for positioning the magnetic head to the target track whose eccentricity of first-order rotation is compensated.

According to a feature of the present invention, it is possible to realize a head-positioning servo system with increased displacement and high positioning-accuracy.

Further, it is also possible to provide a magnetic head test system and magnetic disk test system capable of performing a test of a magnetic disk with large eccentricity of a target track, as well as a test of a magnetic head using a magnetic disk with large eccentricity of a target track in an accurate manner.

DETAILED DESCRIPTION OF THE PREFERRED EMBODIMENTS

Hereinafter preferred embodiments of the present invention will be described with reference to the accompanying drawings.

First Embodiment

Figure 1:
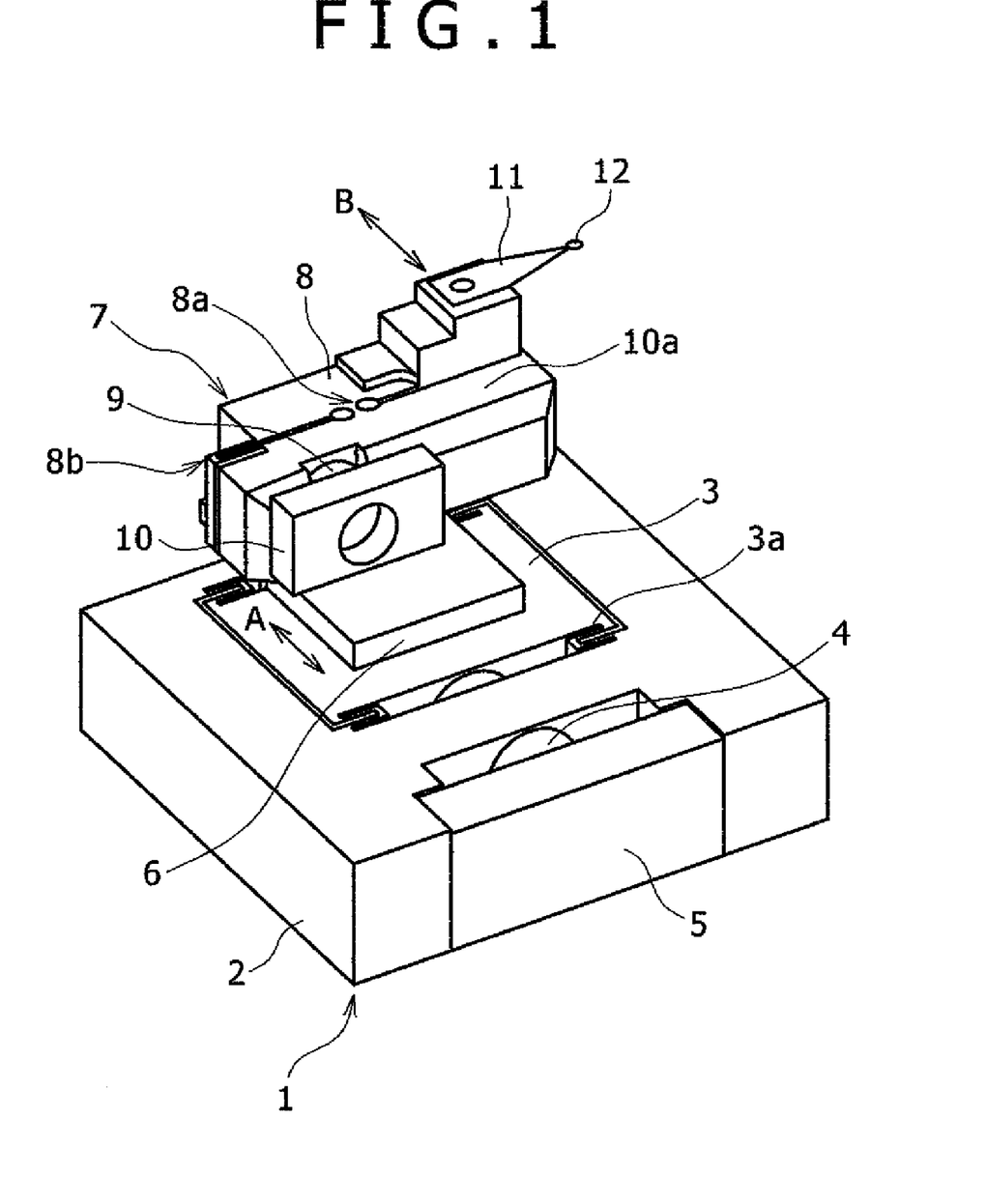
FIG. 1 is an overall view of the mechanical part of a magnetic head-positioning servo system according to a first embodiment of the present invention.
Figure 2:
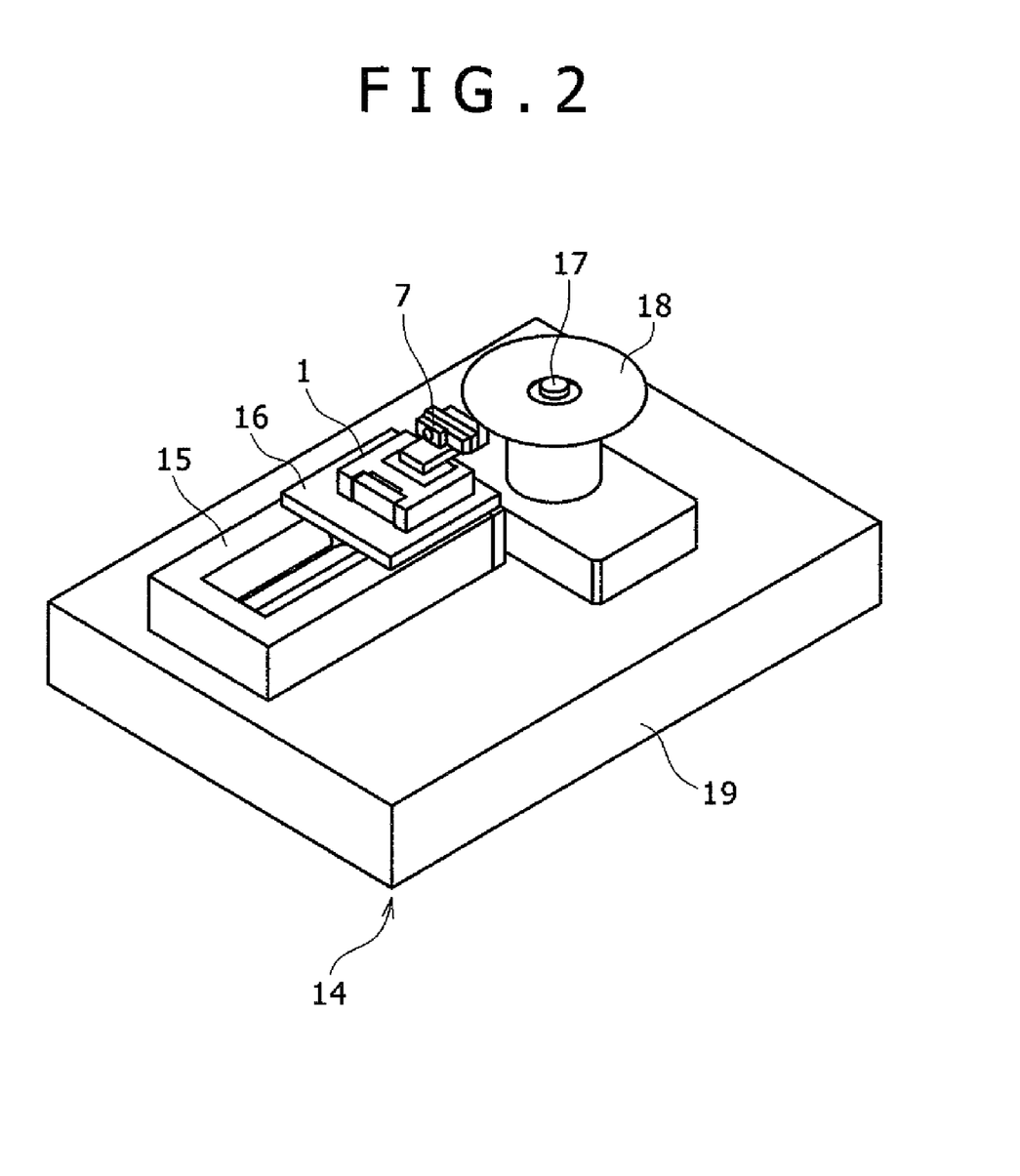
FIG. 2 is an overall view of the mechanical part of a magnetic disk test system using the magnetic head-positioning servo system shown in FIG. 1.
Figure 3:
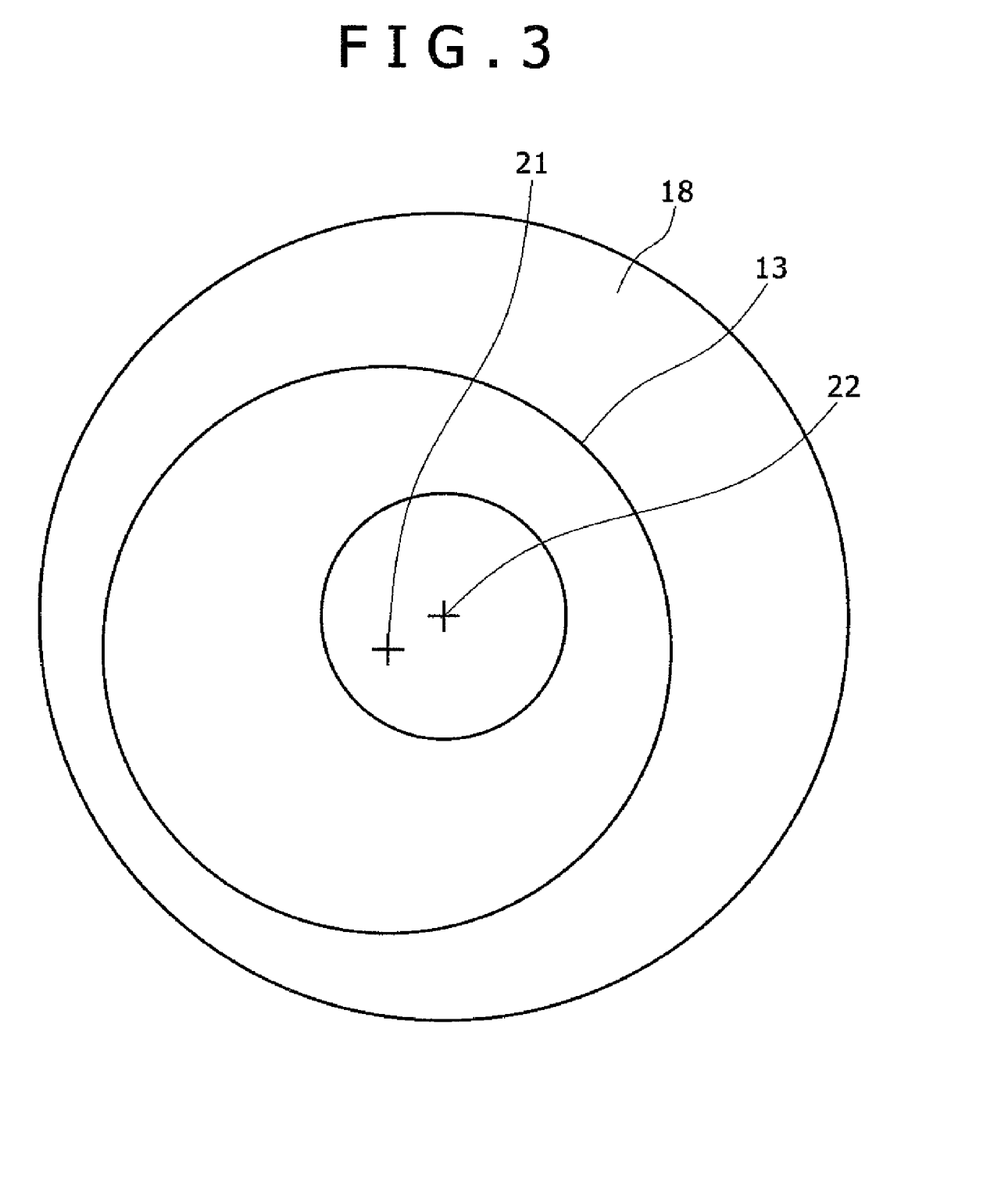
FIG. 3 is a view showing the relation between a track and a magnetic disk to be tested by the magnetic disk test system shown in FIG. 2.

FIG. 1 is an overall view of the mechanical part of a magnetic head-positioning servo system according to a first embodiment. FIG. 2 is an overall view of the mechanical part of a magnetic disk test system using the magnetic head-positioning servo system shown in FIG. 1. FIG. 3 is a view showing the relation between a track and a magnetic disk to be tested by the magnetic disk test system shown in FIG. 2.

The magnetic disk test system is a system for testing the characteristics of a magnetic disk by a magnetic head reading the magnetic information written in advance to the magnetic disk as well as the magnetic information written to the magnetic disk by the magnetic head.

In FIG. 1, the mechanical part of the magnetic head-positioning servo system is configured such that a second fine actuator, namely a piezo-actuator 7 is mounted on a first fine actuator, namely a piezo-stage 1. The piezo-stage 1 includes a base 2, a moving table 3, support members 3a for supporting the moving table 3 at the four corners thereof, a first piezoelectric element 4, and a first attachment plate 5. The rear end of the first piezoelectric element 4 is fixed to the base 2 by the first attachment plate 5. At this time, the front end of the piezoelectric element 4 is to be brought into contact with the moving table 3. The moving table 3 can be moved in the direction of arrow A by driving the first piezoelectric element 4.

The piezo-actuator 7 includes a moving part 8, support members 8a and 8b for supporting the moving part 8, a second piezoelectric element 9, a second attachment plate 10, and a fixed part 10a.

The rear end of the second piezoelectric element 9 is fixed to the fixed part 10a by the second attachment plate 10. At this time, the front end of the second piezoelectric element 9 is to be brought into contact with the moving part 8.

The second piezoelectric element 9 is driven to let the moving part 8 to move in the direction of arrow B. The piezo-actuator 7 is mounted on the moving table 3 of the piezo-stage 1 through an intermediate attachment plate 6.

In this configuration, the generating displacement of the piezo-actuator 7 is larger than the generating displacement of the piezo-stage 1. The magnitude of generating displacement of the piezo-stage 1 is just equal to the magnitude of displacement of the first piezoelectric element 4. Meanwhile, because the magnitude of displacement of the second piezoelectric element 9 is magnified at the position at which a head-suspension 11 is attached to the moving part 8, the generating displacement of the piezo-actuator 7 can be made larger than the generating displacement of the piezo-stage 1, even if the magnitude of displacement of the second piezoelectric element 9 is smaller than the magnitude of displacement of the first piezoelectric element 4.

More specifically, this is a lever structure with the moving part 8 supported by the supporting member 8b as a supporting point.

In the lever structure of the moving part 8, the displacement magnifying ratio of the head-suspension 11 at the attachment portion to the displacement of the second piezoelectric element 9 can be made equal to or greater than 10 without any adverse effect on the vibration characteristics.

Incidentally, the magnetic head 12 is removably attached to the moving part 8 of the piezo-actuator 7 through the head-suspension 11.

The reason why the piezo-stage 1 and the piezo-actuator 7 both use piezoelectric elements are that the characteristics of the piezoelectric elements are suitable for the positioning actuator. The characteristics of the piezoelectric element include the following: having large generative force, small size, high displacement resolution, less power consumption than that of electromagnetic systems, and having no problem of leakage magnetic flux due to no magnetic field being necessary.

A magnetic disk test system's mechanical part 14 shown in FIG. 2 includes a mounting base 19, a magnetic disk 18, a spindle 17, a coarse actuator 15, and the mechanical part of the magnetic head-positioning servo system shown in FIG. 1.

The coarse actuator 15 and the spindle 17 are fixed on the mounting base 19.

The magnetic disk 18 is rotatably fixed on the spindle 17.

The piezo-stage 1 of the mechanical part of the magnetic head-positioning servo system shown in FIG. 1 is fixed on a coarse table 16 of the coarse actuator 15.

The track of the magnetic disk 18 may be written to the magnetic disk 18 mounted on the spindle 17, by the magnetic head 12 while rotating the spindle 17, or may be written in advance to the magnetic disk 18.

In the latter case, as shown in FIG. 3, a magnetic disk center 22 and a track center 21 are often displaced from each other. The magnetic disk is mounted on the spindle 17 so that the magnetic disk center 22 is coincident with the center of the spindle 17. When the magnetic disk 18 is rotated, the track 13 is eccentric to the center of the spindle 17.

The magnetic head 12 is positioned at approximately the target radius of the magnetic disk 18 by the coarse actuator 15. Then, the magnetic head 12 follows the target track, for example, the track 13, under the cooperative control of the piezo-actuator 7 and the piezo-stage 1.

At this time, of the displacement of the magnetic head 12 with respect to the track 13, the maximum repeatable-eccentricity (hereinafter referred to as the eccentricity) is compensated by the piezo-actuator 7, and the displacement of the other components is compensated by the piezo-stage 1. It should be noted that most of the eccentricity is occupied by the eccentricity of first-order rotation.

Figure 4:
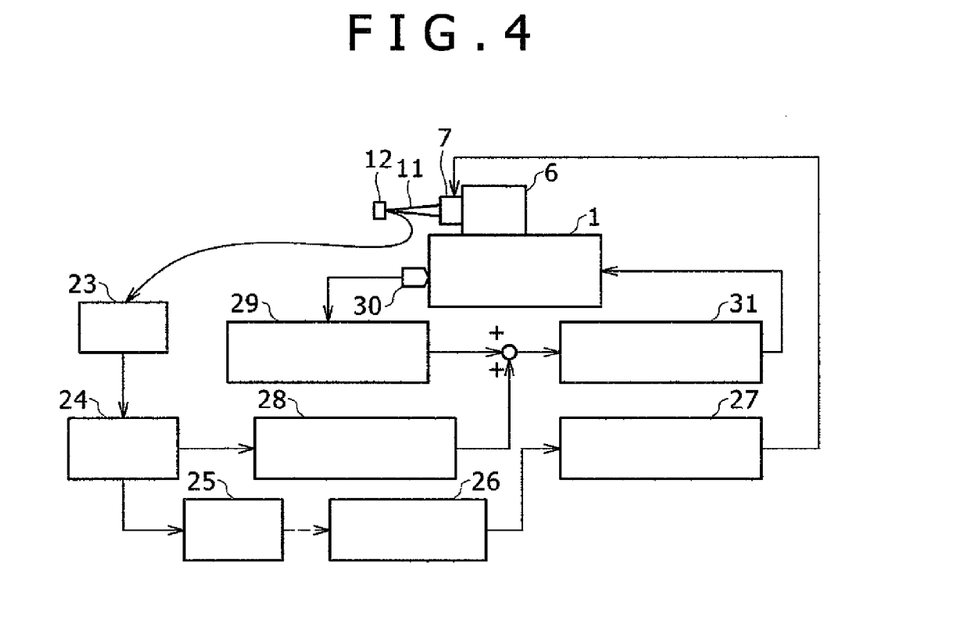
FIG. 4 is a schematic diagram of the magnetic head-positioning servo system shown in FIG. 1.

An example of the compensating method will be described with reference to FIG. 4. FIG. 4 is a schematic diagram of the magnetic head-positioning servo system shown in FIG. 1.

A signal is detected by the magnetic head 12 attached to the piezo-actuator 7 through the head-suspension 11. The detected signal is amplified by an amplifier 23, and is converted to head positioning error information by a servo demodulating circuit 24. The eccentricity is identified from the head positioning error information by an eccentricity detection circuit 25.

Based on the identified eccentricity, an eccentricity compensation table data storage circuit 26 inputs, as an instruction value, displacement information necessary for compensating the eccentricity to a piezo-actuator driver 27.

The piezo-actuator driver 27 applies a voltage corresponding to the instruction value to the piezo-actuator 7 to compensate the eccentricity by the piezo-actuator 7.

Based on the head-positioning error information output from the servo demodulating circuit 24, a piezo-actuator compensation circuit 28 inputs the compensation value with the piezo-stage to a piezo-stage driver 31.

Further, the displacement of the piezo-stage 1 from the reference position is detected by a position sensor 30. Then, the displacement data is input to a piezo-stage compensation circuit 29.

The piezo-stage compensation circuit 29 inputs an instruction value to the piezo-stage driver 31.

Based on the compensation value from the piezo-actuator compensation circuit 28 and on the instruction value from the piezo-stage compensation circuit 29, the piezo-stage driver 31 generates a drive voltage of the piezo-stage 1, thereby operating the piezo-stage 1 to compensate the displacement of the components other than the eccentricity component, between the magnetic head 12 and the track 13.

According to this method, of the displacement of the magnetic head 12 with respect to the track 13, the eccentricity is compensated by the piezo-actuator 7, and the displacement of the other components is compensated by the piezo-stage 1.

As is apparent from FIG. 1, the mass to be moved by the piezo-actuator 7 is smaller than the mass to be moved by the piezo-stage 1. Thus, the eccentricity is compensated by the piezo-actuator 7 rather than by the piezo-stage 1, so that the driving reaction force is small and the vibration is reduced. As a result, the magnetic head 12 can better follow the track 13, enabling an accurate test of the magnetic disk 18.

If the natural frequency of the piezo-stage 1 and the mechanical parts mounted thereon can be set much higher than the driving frequency, it would be possible to reduce the influence of the magnitude of the vibration generated due to the driving reaction force on the positioning error of the magnetic head 12. However, in order to increase the natural frequency, it is necessary to use a material having high rigidity and low density compared to those of the iron-based and/or aluminum-based alloys currently used. This leads to an increase in the costs for realizing the magnetic head-positioning servo system as well as the magnetic disk test system using the magnetic head-positioning servo system.

Thus, according to this embodiment, it is possible to reduce the costs for realizing the magnetic head-positioning servo system as well as the magnetic disk test system using the magnetic head-positioning servo system.

In this embodiment, using iron-based and/or aluminum-based alloys, the following can be realized: a moving mass of 200 g to be moved by the piezo-stage 1, a natural frequency of 600 Hz of the piezo-stage 1 including all the moving mass mounted thereon, a maximum generating displacement of 15 micrometers (microns) of the piezo-stage 1, a moving mass of 10 g to be moved by the piezo-actuator 7, a natural frequency of 900 Hz of the piezo-actuator 7 including all the moving mass mounted thereon, and a maximum generating displacement of 100 micrometers (microns) of the piezo-actuator 7. In addition, excellent eccentricity compensation characteristics can also be obtained.

Second Embodiment

Figure 5:
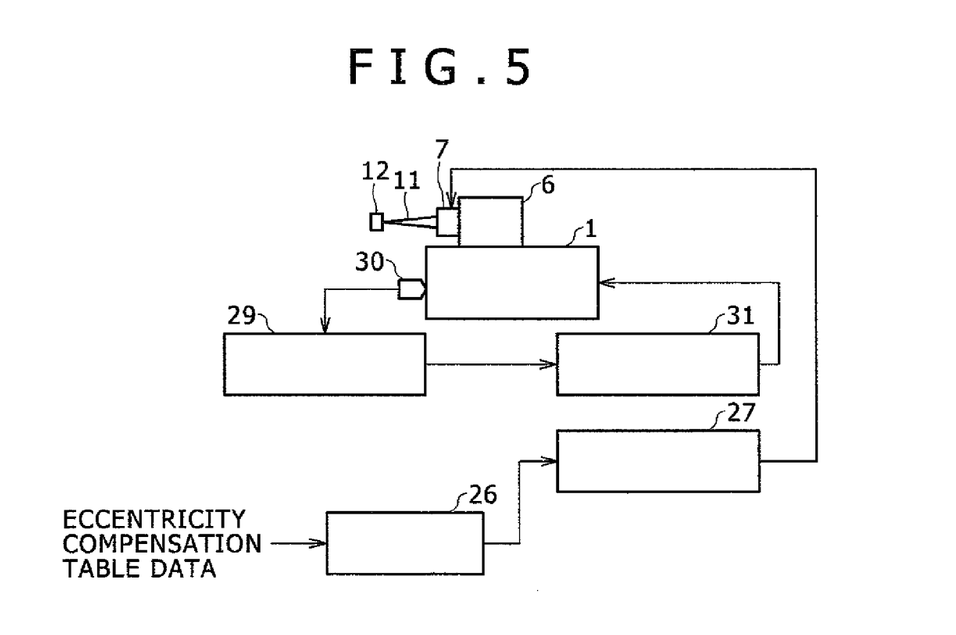
FIG. 5 is a schematic diagram of a magnetic head-positioning servo system according to a second embodiment of the present invention.

FIG. 5 is a schematic view of a magnetic head-positioning servo system according to a second embodiment. The mechanical part of the second embodiment is the same as that of the first embodiment.

The eccentricity compensation table data storage circuit 26 inputs an instruction value based on the eccentricity compensation table data that is prepared in advance to the piezo-actuator driver 27 to compensate the eccentricity.

The piezo-actuator driver 27 applies a voltage corresponding to the instruction value to the piezo-actuator 7 to compensate the eccentricity by the piezo-actuator 7.

The displacement of the piezo-stage 1 from the reference position is detected by the position sensor 30, and is input to the piezo-stage compensation circuit 29. The piezo-stage compensation circuit 29 inputs an instruction value to the piezo-stage driver 31.

Based on the instruction value from the piezo-stage compensation circuit 29, the piezo-stage driver 31 generates a drive voltage of the piezo-stage 1, thereby operating the piezo-stage 1 to compensate the displacement of the components, other than the eccentric component, between the magnetic head 12 and the track 13.

According to this method, of the displacement of the magnetic head 12 with respect to the track 13, the eccentricity is compensated by the piezo-actuator 7, and the displacement of other components is compensated by the piezo stage 1.

As is apparent from FIG. 1, the mass to be moved by the piezo-actuator 7 is smaller than the mass to be moved by the piezo-stage 1. Thus, the eccentricity is compensated by the piezo-actuator 7 rather than by the piezo-stage 1, so that the driving reaction force is small and the vibration is reduced.

As a result, also in the second embodiment, the magnetic head 12 can better follow the track 13, enabling an accurate test of the magnetic disk 18.

Third Embodiment

Figure 6:
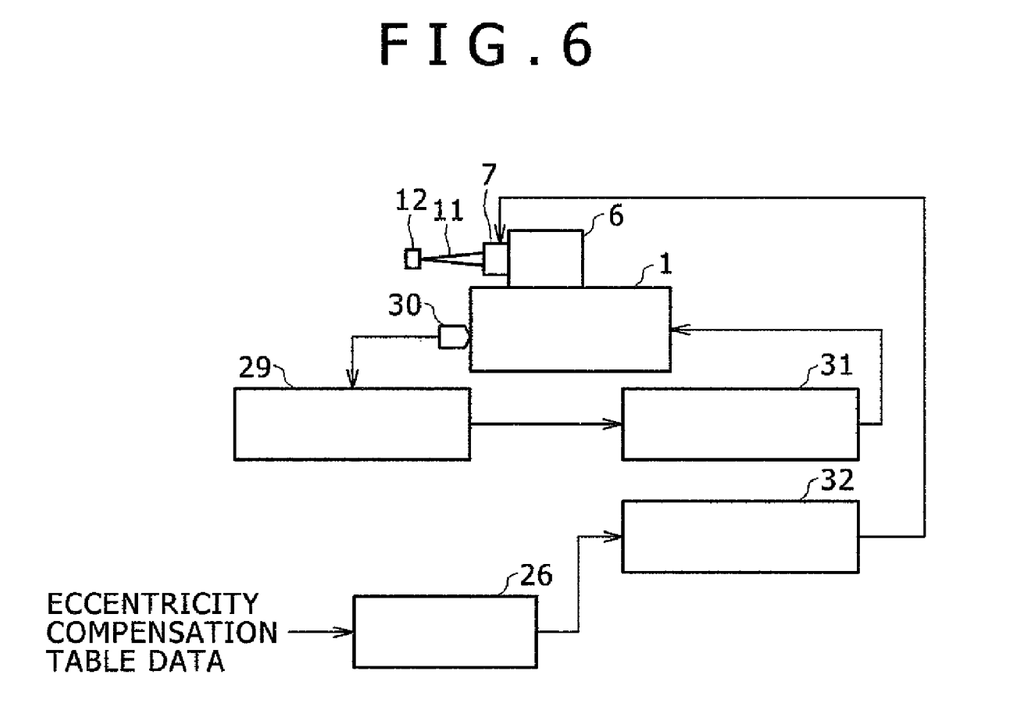
FIG. 6 is a block diagram of a magnetic head-positioning servo system according to a third embodiment of the present invention.

FIG. 6 is a schematic view of a magnetic head-positioning servo system according to a third embodiment. The configuration of the mechanical part of the third embodiment is the same as those of the first and second embodiments.

The eccentricity compensation table data storage circuit 26 inputs an instruction value, based on the eccentricity compensation table data that is prepared in advance, to a current pulse-controlled piezo-actuator driver 32 to compensate the eccentricity.

The current pulse-controlled piezo-actuator driver 32 applies a current pulse corresponding to the instruction value to the piezo-actuator 7 to compensate the eccentricity by the piezo-actuator 7.

The displacement of the piezo-stage 1 from the reference position is detected by the position sensor 30, and is input to the piezo-stage compensation circuit 29.

The piezo-stage compensation circuit 29 inputs an instruction value to the piezo-stage driver 31.

Based on the instruction value from the piezo-stage compensation circuit 29, the piezo-stage driver 31 generates a drive voltage of the piezo-stage 1, thereby operating the piezo-stage 1 to compensate the displacement of the components other than the eccentricity component, between the magnetic head 12 and the track 13.

According to this method, of the displacement of the magnetic head 12 with respect to the track 13, the eccentricity is compensated by the piezo-actuator 7, and the displacement of the other components is compensated by the piezo-stage 1.

As is apparent from FIG. 1, the mass to be moved by the piezo-actuator 7 is smaller than the mass to be moved by the piezo-stage 1. Thus, the eccentricity is compensated by the piezo-actuator 7 rather than by the piezo-stage 1, so that the driving reaction force is small and the vibration is reduced.

In the case of the piezoelectric element driven by current pulse, the amount of charge applied to the piezoelectric element is precisely controlled. Thus, compared to the piezoelectric element driven by voltage, the generating displacement of the piezoelectric element driven by current pulse is controlled more precisely with reduced generating displacement hysteresis. In this embodiment, since the piezo-actuator 7 is controlled by current pulse drive, the generating displacement hysteresis is reduced, thereby letting the magnetic head 12 to follow the track 13 more accurately than the second embodiment.

As a result, also in the third embodiment, it is possible to achieve an accurate test of the magnetic disk 18.

Fourth Embodiment

A fourth embodiment is a magnetic head test system with the same configuration as that of the second embodiment. In other words, the mechanical part of the magnetic head-positioning servo system has the configuration of FIG. 1, the mechanical part of the magnetic head test system has the configuration of FIG. 2, and the magnetic head-positioning servo system has the configuration of FIG. 5. The magnetic head test system is a system for testing the characteristics of the magnetic head 12 by the magnetic head 12 reading the magnetic information written in advance to the magnetic disk 18 as well as the magnetic information written to the magnetic disk 18 by the magnetic head 12.

In FIG. 5, the eccentricity compensation table data storage circuit 26 inputs an instruction value based on the eccentricity compensation table data that is prepared in advance to the piezo-actuator driver 27 to compensate the eccentricity.

The piezo-actuator driver 27 applies a voltage corresponding to the instruction value to the piezo-actuator 7 to compensate the eccentricity by the piezo-actuator 7.

The displacement of the piezo-stage 1 from the reference position is detected by the position sensor 30, and is input to the piezo-stage compensation circuit 29. The piezo-stage compensation circuit 29 inputs an instruction value to the piezo-stage driver 31.

Based on the instruction value from the piezo-stage compensation circuit 29, the piezo-stage driver 31 generates a drive voltage of the piezo-stage 1, thereby operating the piezo-stage 1 to compensate the displacement of the components other than the eccentricity component, between the magnetic head 12 and the track 13.

According to this method, of the displacement of the magnetic head 12 with respect to the track 13, the eccentricity is compensated by the piezo-actuator 7, and the displacement of the other components is compensated by the piezo-stage 1.

As is apparent from FIG. 1, the mass to be moved by the piezo-actuator 7 is smaller than the mass to be moved by the piezo-stage 1. Thus, the eccentricity is compensated by the piezo-actuator 7 rather than by the piezo-stage 1, so that the driving reaction force is small and the vibration is reduced.

As a result, also in the fourth embodiment, the magnetic head 12 can better follow the track 13, enabling an accurate test of the magnetic head 12.

Although in the above embodiments the description has been made on the magnetic disk test system, the present invention is also applicable to magnetic head-positioning servo systems for magnetic head test systems, and to testing magnetic heads. In addition, it is also applicable to systems for evaluating both magnetic disks and magnetic heads.

What is claimed is:

1. A magnetic head-positioning servo system for positioning a magnetic head on a predetermined track of a magnetic disk in response to a servo signal read from the track of the magnetic disk, the magnetic head-positioning servo system comprising:
a first fine actuator, supported directly on a fixed base or a coarse actuator, or supported through an intermediary; and
a second fine actuator, supported directly on the first fine actuator, or supported through an intermediary;
wherein the second fine actuator is configured to support the magnetic head through a head-suspension, and configured to move the head-suspension;
wherein the second fine actuator is configured to let the magnetic head follow the maximum repeatable-eccentricity of a target track written in the magnetic disk;
wherein the first fine actuator is configured to let the magnetic head follow the target track whose maximum repeatable-eccentricity has been compensated by the second fine actuator; and
wherein the second fine actuator is configured to generate a larger generating displacement than a generating displacement generated by the first fine actuator.

2. The magnetic head-positioning system according to claim 1, wherein the first and second fine actuators are piezo-actuators.

3. The magnetic head-positioning system according to claim 2, wherein the second fine actuator is controlled by current pulse drive.

4. The magnetic head-positioning system according to claim 1, wherein the first fine actuator generates a displacement of at most 15 micrometers, and the second fine actuator generates a displacement of at most 100 micrometers.

5. The magnetic head-positioning system according to claim 4, wherein the first fine actuator has a natural frequency of 600 Hz and the second fine actuator has a natural frequency of 900 Hz.

6. The magnetic head-positioning system according to claim 1, wherein the first fine actuator has a natural frequency of 600 Hz and the second fine actuator has a natural frequency of 900 Hz.

7. A magnetic head-positioning servo system for positioning a magnetic head on a predetermined track of a magnetic disk in response to a servo signal read from the track of the magnetic disk, the magnetic head-positioning servo system comprising:
a first fine actuator; and
a second fine actuator;
wherein the first fine actuator is supported directly on a fixed base or a coarse actuator, or supported through an intermediary;
wherein the second fine actuator is supported directly on the first fine actuator, or supported through an intermediary;
wherein the second fine actuator is configured to support the magnetic head through a head-suspension, and configured to move the head-suspension;
wherein the second fine actuator is configured to let the magnetic head follow the eccentricity of first-order rotation of a target track written in a magnetic disk, and the first fine actuator is configured to let the magnetic head follow the target track whose eccentricity of first order rotation has been compensated by the second fine actuator; and
wherein the second fine actuator is configured to generate a larger generating displacement than a generating displacement generated by the first fine actuator.

8. The magnetic head-positioning system according to claim 7, wherein the first and second fine actuators are piezo-actuators.

9. The magnetic head-positioning system according to claim 8, wherein the second fine actuator is controlled by current pulse drive.

10. The magnetic head-positioning system according to claim 7, wherein the first fine actuator generates a displacement of at most 15 micrometers, and the second fine actuator generates a displacement of at most 100 micrometers.

11. The magnetic head-positioning system according to claim 10, wherein the first fine actuator has a natural frequency of 600 Hz and the second fine actuator has a natural frequency of 900 Hz.

12. The magnetic head-positioning system according to claim 7, wherein the first fine actuator has a natural frequency of 600 Hz and the second fine actuator has a natural frequency of 900 Hz.

13. A magnetic disk test system comprising:
a magnetic head-positioning servo system for positioning a magnetic head on a predetermined track of a magnetic disk in response to a servo signal read from the track of the magnetic disk, the magnetic head-positioning servo system including:
  a first fine actuator, and
  a second fine actuator;
a coarse actuator for supporting and moving the magnetic head-positioning servo system;
a spindle for rotating a disk; and
a mounting base for supporting the coarse actuator and the spindle;
wherein the first fine actuator is supported directly on the mounting base or the coarse actuator, or supported through an intermediary;
wherein the second fine actuator is supported directly on the first fine actuator, or supported through an intermediary;
wherein the second fine actuator is configured to support the magnetic head through a head-suspension, and configured to move the head-suspension;
wherein the second fine actuator is configured to let the magnetic head to follow the maximum repeatable-eccentricity of a target track written in the magnetic disk;
wherein the first fine actuator is configured to let the magnetic head to follow the target track whose maximum repeatable-eccentricity has been compensated by the second fine actuator; and
wherein the second fine actuator is configured to generate a larger generating displacement than a generating displacement of the first fine actuator.

14. A magnetic disk test system comprising:
a magnetic head-positioning servo system for positioning a magnetic head on a predetermined track of a magnetic disk in response to a servo signal read from the track of the magnetic disk, the magnetic head-positioning servo system including:
  a first fine actuator, and
  a second fine actuator;
a coarse actuator for supporting and moving the magnetic head-positioning servo system;
a spindle for rotating a disk; and
a mounting base for supporting the coarse actuator and the spindle;
wherein the first fine actuator is supported directly on the mounting base or the coarse actuator, or supported through an intermediary;
wherein the second fine actuator is supported directly on the first fine actuator, or supported through an intermediary;
wherein the second fine actuator is configured to support the magnetic head through a head-suspension, and configured to move the head-suspension;
wherein the second fine actuator is configured to let the magnetic head follow the eccentricity of first-order rotation of a target track written in a magnetic disk, and the first fine actuator is configured to let the magnetic head follow the target track whose eccentricity of first order rotation has been compensated by the second fine actuator; and
wherein the second fine actuator is configured to generate a larger generating displacement than a generating displacement of the first fine actuator.

15. A magnetic head-positioning servo system for positioning a magnetic head on a predetermined track of a magnetic disk in response to a servo signal read from the track of the magnetic disk, the magnetic head-positioning servo system comprising:
  a first fine actuator, supported by a fixed base or a coarse actuator, and configured to let the magnetic head follow the target track whose maximum repeatable-eccentricity has been compensated by a second fine actuator; and
  the second fine actuator, supported by the first fine actuator, configured to support the magnetic head through a head-suspension, to move the head-suspension, to let the magnetic head follow the maximum repeatable-eccentricity of a target track written in the magnetic disk, and to generate a larger generating displacement than a generating displacement generated by the first fine actuator.

16. The magnetic head-positioning system according to claim 15, wherein the first and second fine actuators are piezo-actuators.

17. The magnetic head-positioning system according to claim 16, wherein the second fine actuator is controlled by current pulse drive.

18. The magnetic head-positioning system according to claim 15, wherein the first fine actuator generates a displacement of at most 15 micrometers, and the second fine actuator generates a displacement of at most 100 micrometers.

19. The magnetic head-positioning system according to claim 15, wherein the first fine actuator has a natural frequency of 600 Hz and the second fine actuator has a natural frequency of 900 Hz.

20. A magnetic disk test system comprising:
a magnetic head-positioning servo system for positioning a magnetic head on a predetermined track of a magnetic disk in response to a servo signal read from the track of the magnetic disk, the magnetic head-positioning servo system including:
  a first fine actuator, supported by a mounting base or a coarse actuator, and configured to let the magnetic head follow the target track whose maximum repeatable-eccentricity has been compensated by a second fine actuator, and
  the second fine actuator, supported by the first fine actuator, and configured to support the magnetic head through a head-suspension, to move the head-suspension, to let the magnetic head follow the maximum repeatable-eccentricity of a target track written in the magnetic disk, and to generate a large generating displacement than a generating displacement generated by the first fine actuator;
the coarse actuator for supporting and moving the magnetic head-positioning servo system;
a spindle for rotating a disk; and
the mounting base for supporting the coarse actuator and the spindle.

* * * * *